US006961234B2

(12) United States Patent
Tanaka et al.

(10) Patent No.: US 6,961,234 B2
(45) Date of Patent: Nov. 1, 2005

(54) DISPLAY SUPPORT MECHANISM

(75) Inventors: Toshiyuki Tanaka, Laguna Niguel, CA (US); Hiroshi Nakamura, Ome (JP); Martin P. Riddiford, London (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 138 days.

(21) Appl. No.: 10/654,834

(22) Filed: Sep. 4, 2003

(65) Prior Publication Data

US 2005/0052834 A1 Mar. 10, 2005

(51) Int. Cl.⁷ .................................. G06F 1/16
(52) U.S. Cl. .................. 361/681; 361/683; 248/917; 248/920; 248/460
(58) Field of Search .................. 361/681, 683; 248/917–923, 460

(56) References Cited

U.S. PATENT DOCUMENTS

| | | | |
|---|---|---|---|
| 5,268,817 A | | 12/1993 | Miyagawa et al. |
| 6,430,038 B1 | * | 8/2002 | Helot et al. ............. 361/681 |
| 6,437,973 B1 | * | 8/2002 | Helot et al. ............. 361/681 |
| 6,464,195 B1 | * | 10/2002 | Hildebrandt ............ 361/681 |
| 6,477,871 B1 | | 11/2002 | Shaw et al. |
| 6,483,445 B1 | | 11/2002 | England |
| 6,504,707 B2 | | 1/2003 | Agata et al. |
| 6,519,148 B2 | | 2/2003 | Nakagawa et al. |
| 6,654,234 B2 | * | 11/2003 | Landry et al. ............. 361/681 |
| 6,774,870 B2 | * | 8/2004 | Mead et al. ............. 361/681 |
| 6,873,521 B2 | * | 3/2005 | Landry et al. ............. 361/681 |
| 2003/0142474 A1 | * | 7/2003 | Karidis et al. ............ 361/683 |
| 2004/0057197 A1 | * | 3/2004 | Hill et al. ............... 361/683 |
| 2005/0052833 A1 | * | 3/2005 | Tanaka et al. ............. 361/681 |

FOREIGN PATENT DOCUMENTS

| | | |
|---|---|---|
| JP | 07-049725 | 2/1995 |
| JP | 10-055227 | 2/1998 |
| JP | 2000-228128 | 8/2000 |
| JP | 2002-222026 | 8/2002 |
| JP | 2003-044169 | 2/2003 |

* cited by examiner

*Primary Examiner*—Lisa Lea-Edmonds
(74) *Attorney, Agent, or Firm*—Blakely Sokoloff Taylor & Zafman

(57) ABSTRACT

One aspect of an embodiment of the display support mechanism for rotating a display housing having a flat panel display about a horizontal axis of rotation. The display support mechanism comprises a first member and a second member. The first member is pivotally coupled to a back display panel of the display housing. The second member is pivotally coupled to the back display panel of the display housing. The second member is substantially coplanar to the first member when the display housing is placed in a first position by rotating the display housing about a horizontal axis. When the display housing is placed in a second position, the second member becomes substantially in parallel with the first member.

30 Claims, 8 Drawing Sheets

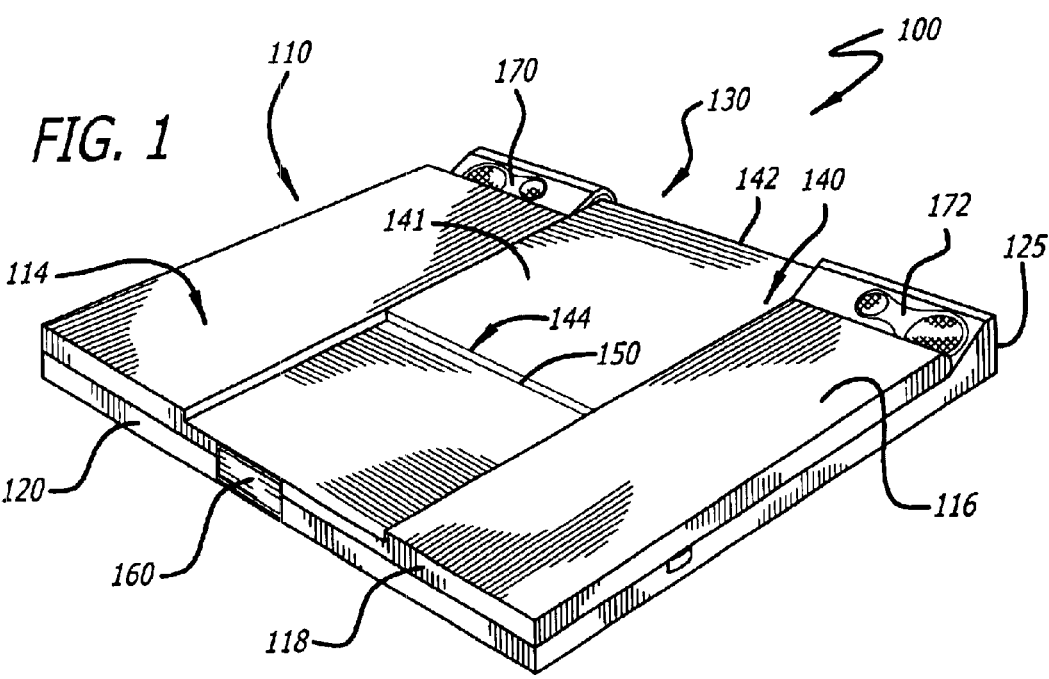
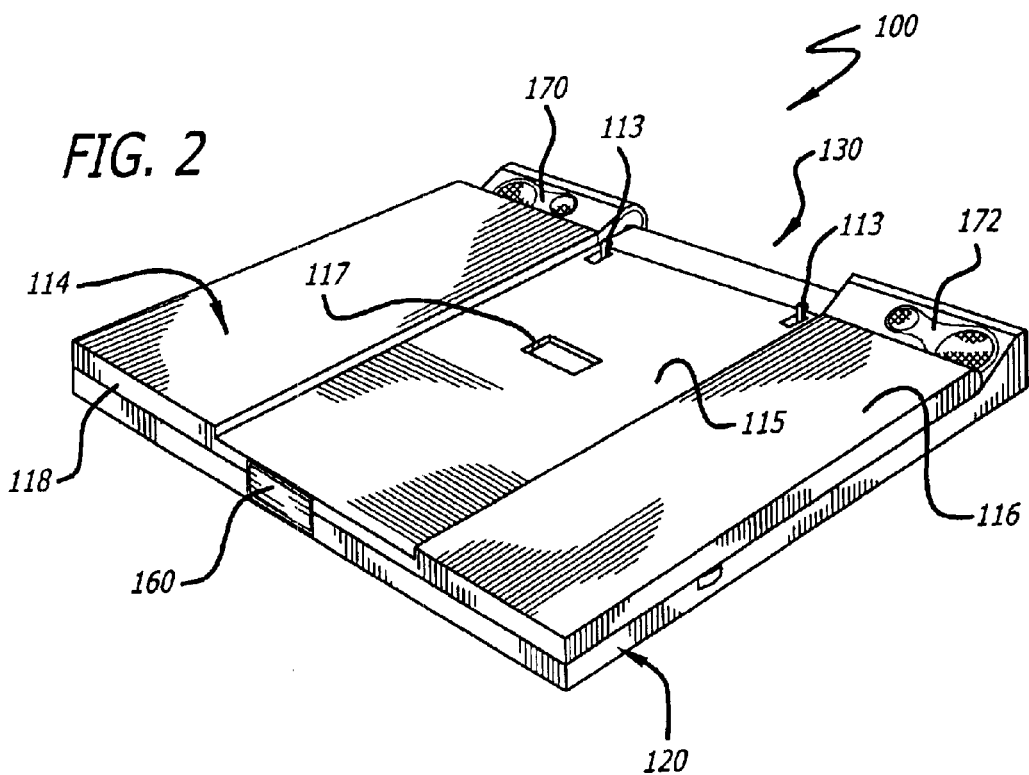

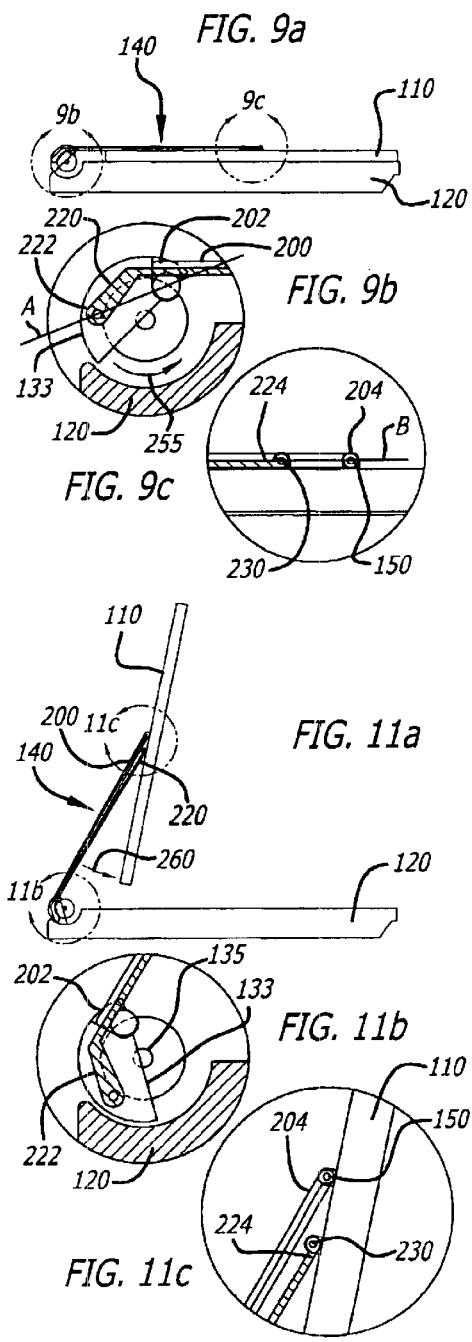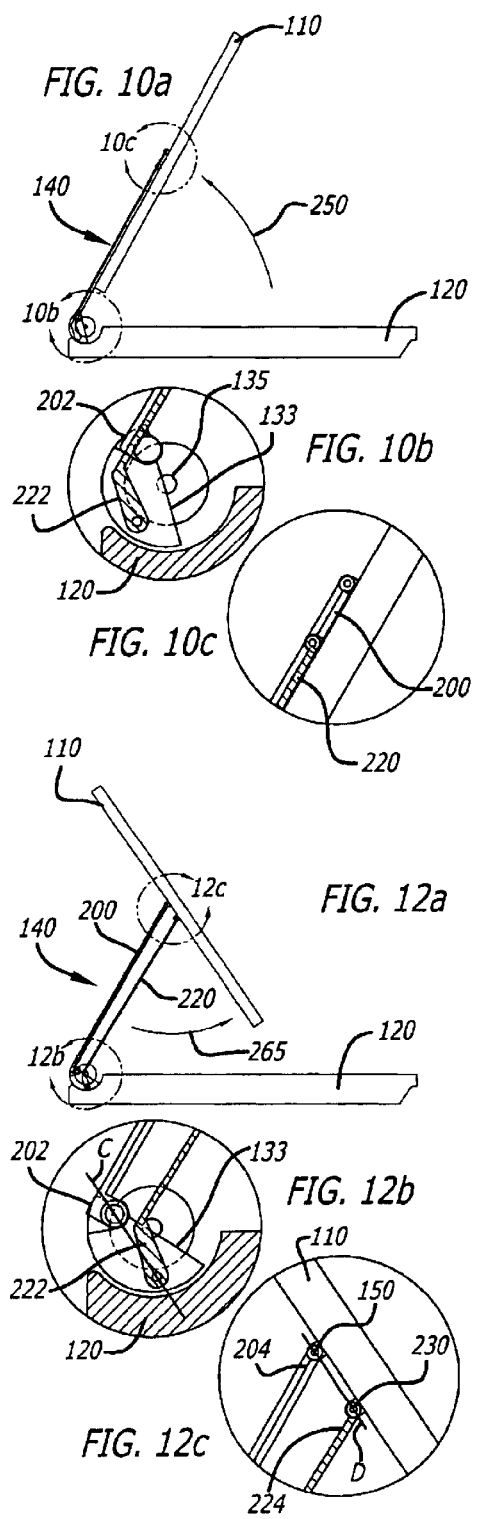

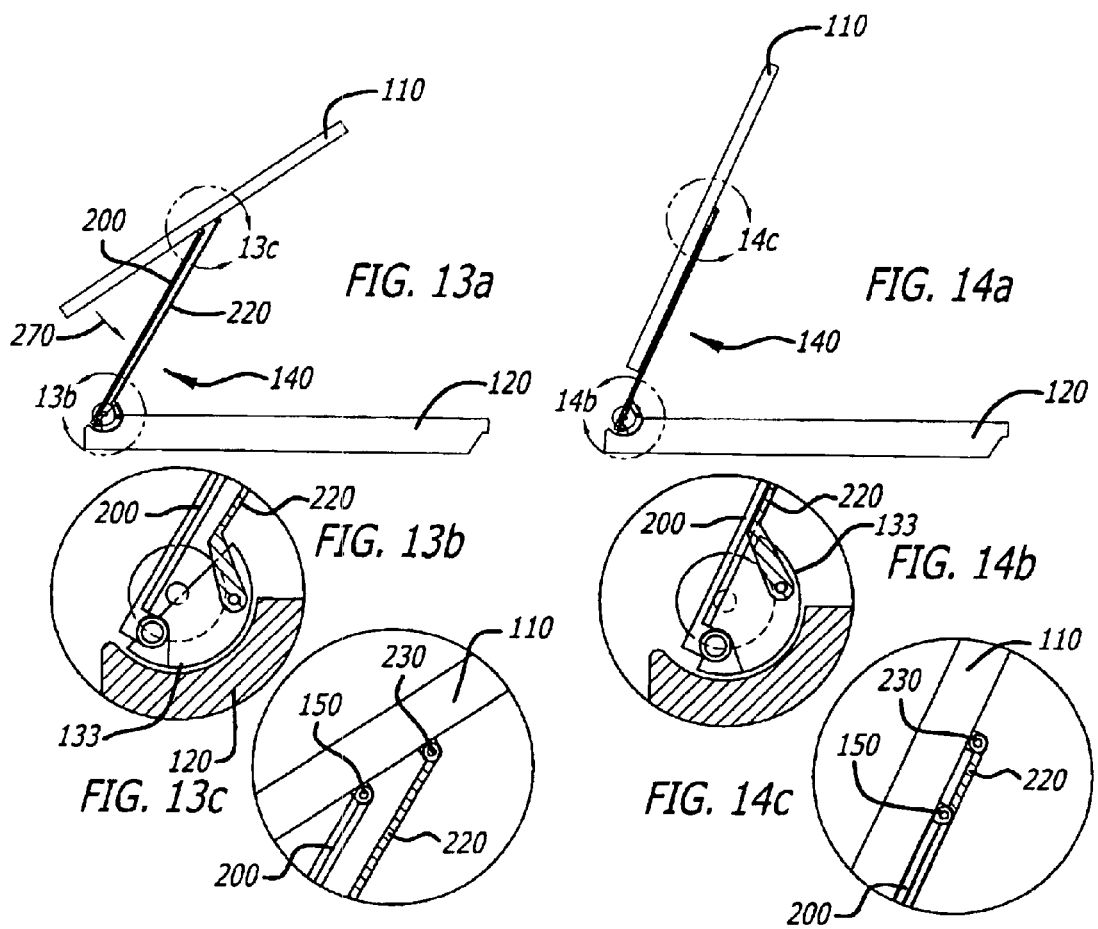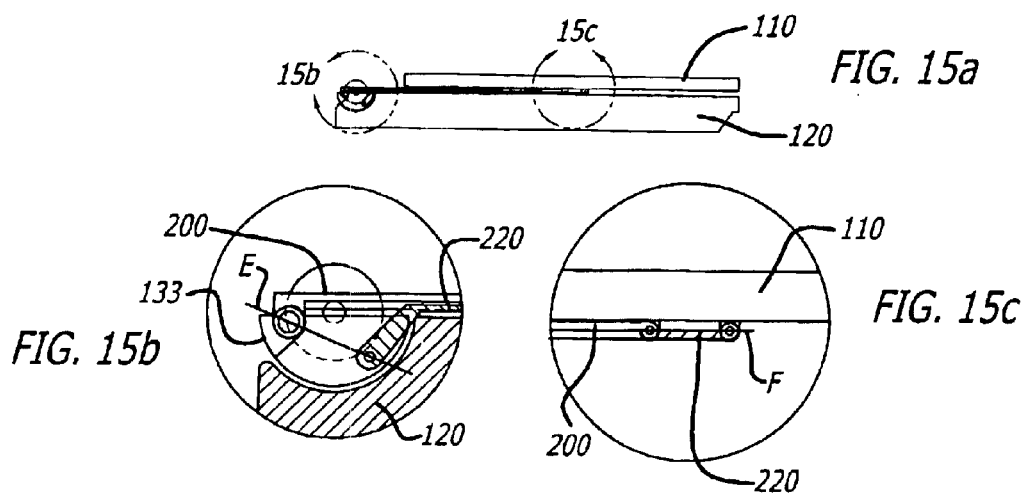

DISPLAY SUPPORT MECHANISM

FIELD

Embodiments of the invention generally relate to the field of electronics. More specifically, embodiments of this invention relate to a display support mechanism for a flat panel display.

GENERAL BACKGROUND

Over the past decade, there has been increased demand for laptop computers, especially in light of their enhanced data processing capabilities. Operating from either external or portable power sources, conventional laptop computers feature a display housing pivotally connected to a body case. Typically, the display housing includes a liquid crystal display (LCD) while the body case includes a keyboard and a secondary input device, such as a roller ball or a touch pad for example.

In order to access the keyboard and view displayed content on the LCD, a user places the body case on a surface (e.g., the user's lap or a fixed surface) and opens the computer by pivoting the display housing away from the body case. As a result, the user is able to access the keyboard and secondary input device as well as to read the displayed content. Similarly, to close the computer after use, the user pivots the display housing toward the body case and secures the display housing thereto.

Recently, due to the growing popularity of personal digital assistants, laptop computers have been configured to alternatively operate as a tablet computer, with a stylus pen operating as the input device. This requires the display housing to be inverted, namely the LCD is positioned to be viewable and resting against the body case. The inverting and pivoting of the display housing has been previously accomplished by a shaft attached to a bottom portion of the display housing. The shaft provides a vertical center axis to allow the display housing to be rotated horizontally 180 degrees about this center axis before it is rotated vertically in a downward direction toward the user. This structure, however, possesses a number of disadvantages.

For instance, one disadvantage is that a substantial amount of force is exerted on the shaft which, over prolonged use, may cause the shaft to break prematurely. Another disadvantage is that the shaft merely provides a single point of contact, which tends to provide an unacceptable amount of instability for the display during adjustment and normal usage. Yet another disadvantage is that a brake hinge may be adapted to a rear surface of the display housing. Thus, the thickness of the electronic device cannot be reduced beyond the sizing of the hinge mechanism itself.

BRIEF DESCRIPTION OF THE DRAWINGS

Features and advantages of embodiments of the invention will become apparent from the following detailed description in which:

FIG. 1 is a perspective view of an exemplary embodiment of an electronic device implemented with an embodiment of the invention and placed in a first (CLOSED) position.

FIG. 2 is a perspective view of the electronic device of FIG. 1 without the display support member.

FIGS. 9A–9C are cross-sectional views of a first exemplary embodiment of the electronic device of FIG. 1 along with detailed views of pivotally coupled ends of first and second members of FIG. 5.

FIGS. 10A–10C are cross-sectional views of a second exemplary embodiment of the electronic device along with detailed views of pivotally coupled ends of the first and second members of FIG. 5.

FIGS. 11A–11C are cross-sectional views of a third exemplary embodiment of the electronic device along with detailed views of pivotally coupled ends of the first and second members of FIG. 5.

FIGS. 12A–12C are cross-sectional views of a fourth exemplary embodiment of the electronic device along with detailed views of pivotally coupled ends of the first and second members of FIG. 5.

FIGS. 13A–13C are cross-sectional views of a fifth exemplary embodiment of the electronic device along with detailed views of pivotally coupled ends of the first and second members of FIG. 5.

FIGS. 14A–14C are cross-sectional views of a sixth exemplary embodiment of the electronic device along with detailed views of pivotally coupled ends of the first and second members of FIG. 5.

FIGS. 15A–15C are cross-sectional views of a seventh exemplary embodiment of the electronic device along with detailed views of pivotally coupled ends of the first and second members of FIG. 5.

DETAILED DESCRIPTION

Figure 3:
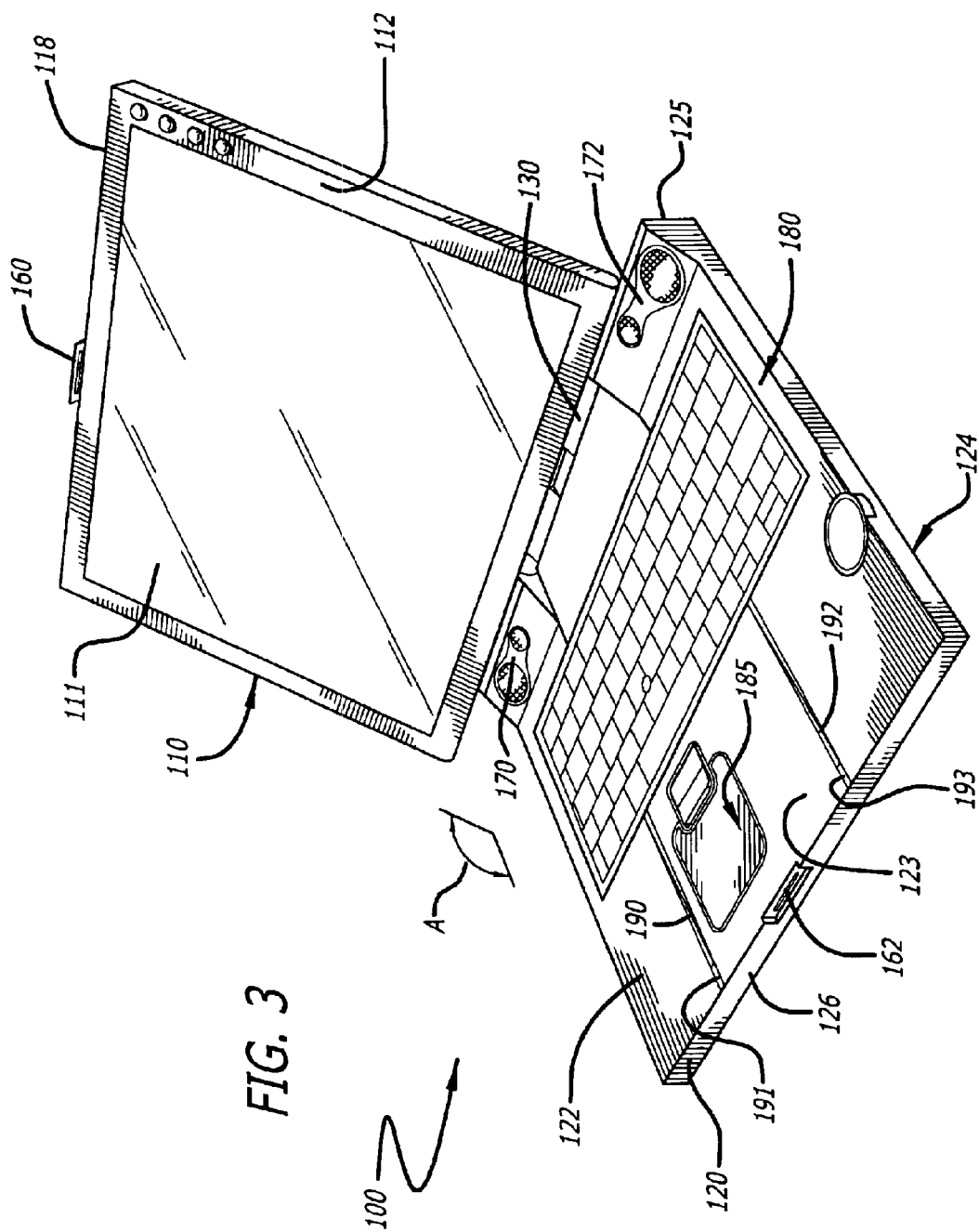
FIG. 3 is a perspective view of an exemplary embodiment of the electronic device of FIG. 1 placed in a second (OPENED) position.

Embodiments of the invention set forth in the following detailed description generally relate to a display support mechanism for a flat panel display. In general, at least one embodiment of the display support mechanism is pivotally coupled to a brake hinge deployed within an electronic device and is physically configured to minimize the thickness of the electronic device and provide greater stability in support of the flat panel display. Also, the overall physical configuration of the electronic device enables the routing of an interconnect through a predetermined conduit placed within the hinge assembly.

In the following description, certain terminology is used to describe certain features of one or more embodiments of the invention. For instance, an "electronic device" is defined as an electronic product with a flat panel display that can be adjusted. In this detailed description, for clarity sake, the electronic device is illustrated as a portable computer that can be converted to a tablet computer. However, it is evident that the invention may be utilized in other types of electronic devices including, but not limited or restricted to personal digital assistants, cellular telephones, digital cameras, video cameras, navigation systems, and the like.

Herein, the terms "rotate," "pivot" as well as varying tenses thereof are generally defined as an angular movement about an axis of rotation. Normally, the axis of rotation is fixed. For this detailed description, the term "vertical" (or any tense thereof) is used to denote a direction of rotation based on a generally horizontal axis of rotation. The term "horizontal" (or any tense thereof) is used to denote a direction of rotation based on a generally vertical axis of rotation.

The term "interconnect" is any medium that is capable of transferring electrical signals from one point to another. Examples of an interconnect may include one or more electrical wires, any type of cable (e.g., flexible printed cable), optical fiber, or the like.

Referring to FIGS. 1–4, perspective views of an illustrative electronic device 100 are shown. Herein, electronic device 100 comprises a display housing 110 that is pivotally coupled to a body case 120 through a hinge assembly 130 and a display support mechanism 140.

Figure 4:
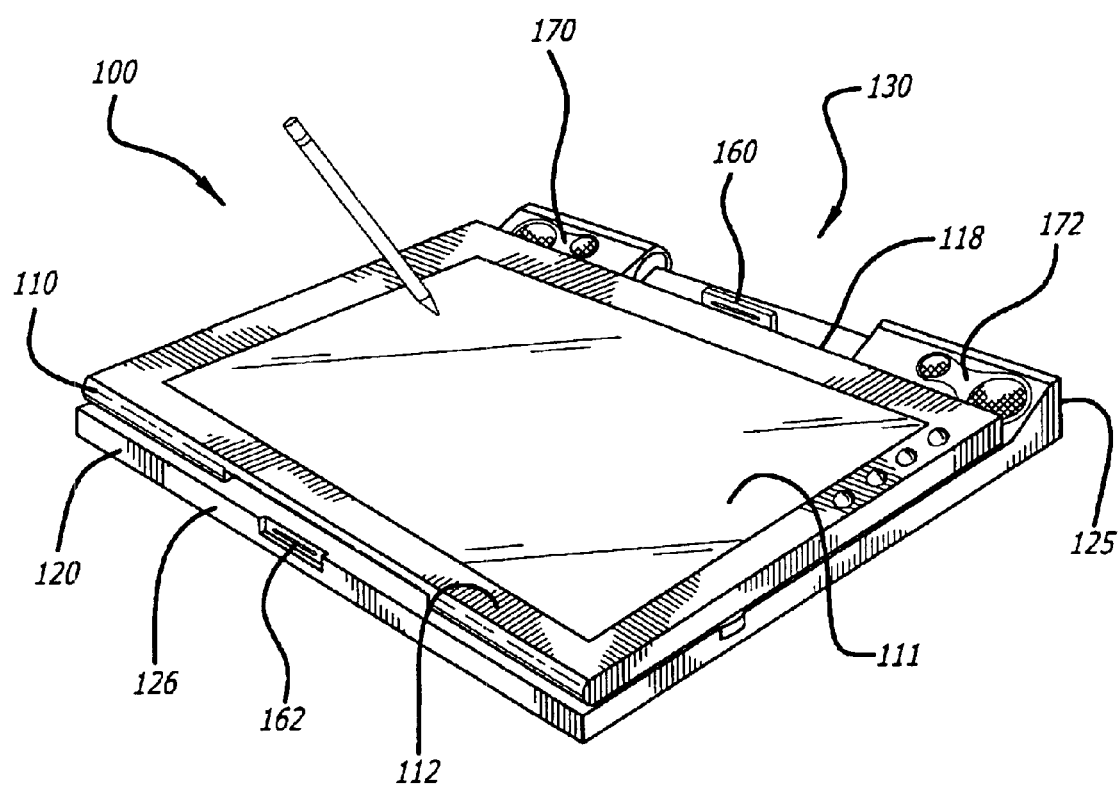
FIG. 4 is a perspective view of an exemplary embodiment of the electronic device of FIG. 1 placed in a third (INVERTED) position.

As illustrated, electronic device 100 is in a first "CLOSED" position (FIGS. 1–2), a second "OPENED" position (FIG. 3) and a third "INVERTED" position (FIG. 4). In each of these positions, a top portion or a bottom portion of display housing 110 is generally flush against display support mechanism 140. Of course, electronic device 100 may be placed in other positions in response to vertical rotation of display housing 110 as described below.

For one embodiment of the invention, as shown in FIGS. 1–4, body case 120 comprises two main panel sections, namely a front panel section 122 and a back panel section 124. These panel sections 122 and 124 are brought together to enclose hardware components and stored software components of electronic device 100. This protects the components from foreign materials and environmental conditions. For this embodiment of the invention, panel sections 122 and 124 are made of non-pliable material such as hardened plastic.

Although not shown, it is contemplated that mechanical or optical drives may be employed within body case 120. Normally, these drives are positioned along an edge of body case 120.

Display housing 110 houses a flat panel display 111 as well as circuitry for generating a displayable image on flat panel display 111. Examples of flat panel display 111 include, but are not limited or restricted to a liquid crystal display (LCD), a plasma display or the like.

For this embodiment of the invention, display housing 110 comprises two panel sections as well, namely a front display panel 112 and a back display panel 114. As shown in detail in FIG. 2, back display panel 114 includes a recessed area 115 having a depth sized to fully accommodate a first member of display support mechanism 140 (see FIG. 5). Thus, when electronic device 100 is in the CLOSED position (FIG. 1), a top surface 116 of back display panel 114 is substantially coplanar with a top surface 141 of display support mechanism 140. Also, it is contemplated that recessed area 115 of back display panel 114 may comprise one or more secondary recessed areas 117 to accommodate thickness variations of members forming display support mechanism 140 as described below.

As further shown in FIG. 2, these recessed areas 115 and/or 117 collectively prevent display support mechanism 140 from coming into direct contact with a keyboard 180 (integrated into front panel section 122) or with a top surface 123 of front panel section 122 of body case 120 when display housing 110 is completely inverted (e.g., vertically rotated so that back panel 114 of display housing 110 is proximate to front panel section 122 of body case 120). For this embodiment of the invention, display housing 110 is inverted when vertically rotated approximately 180 degrees from its orientation when electronic device 100 is in the CLOSED position.

As shown in FIG. 1, hinge assembly 130 is configured for coupling to a bottom edge 125 of body case 120 and a first end 142 of a display support mechanism 140. As one embodiment of the invention, hinge assembly 130 is adapted as a brake hinge, such as a type of friction hinge for example, in order to maintain display housing 110 at a selected angle of rotation above body case 120. For instance, hinge assembly 130 may be adapted to maintain display housing 110 at an angle A, where "A" ranges between approximately 30 degrees to 150 degrees (FIG. 3).

A first hinge unit 150 is adapted to a second end 144 of display support mechanism 140. As one embodiment of the invention, first hinge unit 150 comprises a single hinge or multiple hinges positioned approximately at a longitudinal center of back display panel 114 of display housing 110. It is contemplated, however, that first hinge unit 150 may be offset from the longitudinal center. First hinge unit 150 enables display housing 110 to be vertically rotated, according to a horizontal axis of rotation established by first hinge unit 150. First hinge unit 150 further enables display housing 110 to be inverted as shown in FIG. 4.

Referring still to FIG. 1–4, a fastener 160 is positioned along a top edge 118 of display housing 110 for fastening to a complimentary fastener 162, which is positioned on a top edge 126 of body case 120. These fasteners 160 and 162, when engaged, prevent the angular rotation of display housing 110 and maintain electronic device 110 in a CLOSED position until disengaged.

Dual speakers 170 and 172 are integrated into body case 120 and separated by display support mechanism 140. Speakers 170 and 172 are substantially visible when the display housing 110 is lowered and electronic device 100 is in a CLOSED position.

As shown in FIG. 3, in an OPENED position, electronic device 100 provides the user access to a keyboard 180 integrated into body case 120. In addition, electronic device 100 provides the user access to a secondary input device 185 integrated into body case 120. Examples of the secondary input device 185 may include a touch pad or track ball for example.

For one embodiment of the invention, one or more channels 190 and 192 are formed on front panel section 122. Each channel 190 and/or 192 includes recessed areas 191 and 193 to receive one or more spring-loaded retention hooks 113 positioned on back display panel 114 as shown in FIG. 2. Spring-loaded retention hooks 113 recoil when display housing 110 is being inverted, and thus, are engaged with recessed areas 191 and 193 when display housing 110 is in an INVERTED position (FIG. 4). Otherwise, when display housing 110 is attached to display support mechanism 140 (e.g. electronic device 100 in OPENED or CLOSED position), spring-loaded retention hooks 113 are pushed into display housing 110 by display support mechanism 140.

It is contemplated that different areas of display housing 110 and body case 120 may be adapted with different materials. For instance, a portion of front panel section 122 surrounding secondary input device 185 may be adapted with stainless steel or another metal composition to improve resiliency to damage after prolonged use.

Figure 5:
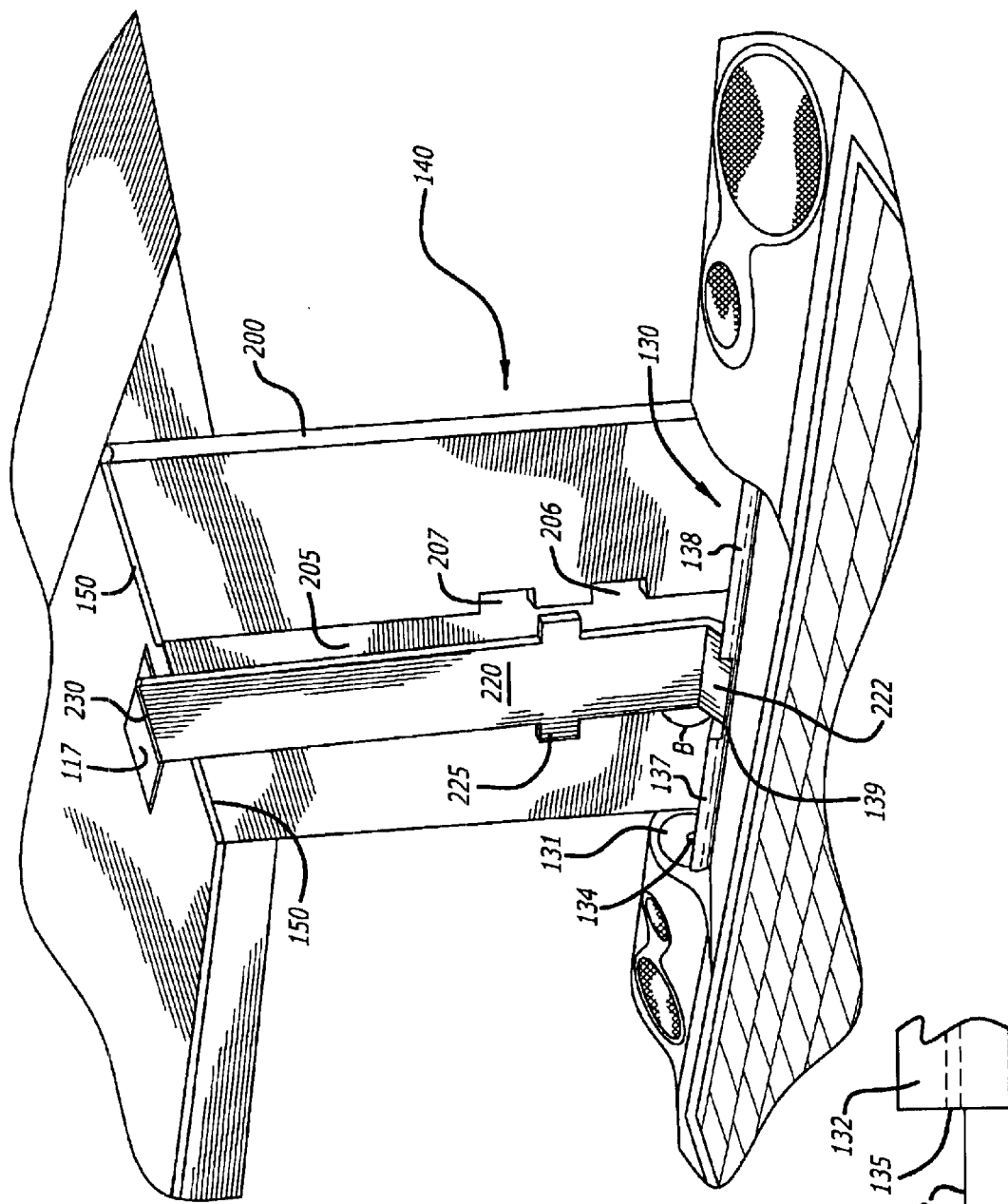
FIG. 5 is a perspective view of a first exemplary embodiment of display support mechanism of FIG. 1.

Referring now to FIG. 5, a perspective view of a first embodiment of display support mechanism 140 of FIG. 1 is shown. Display support mechanism 140 comprises a first member 200 and a second member 220. In general, first member 200 is coupled to both hinge assembly 130 and first hinge unit 150. Second member 220 is coupled to hinge assembly 130 and a second hinge unit 230 that is offset from first hinge unit 150. At least some and perhaps all of these couplings are pivotal in nature.

Figure 6:
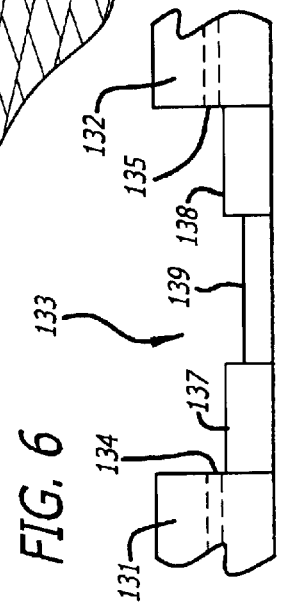
FIG. 6 is a cross-sectional view of an exemplary embodiment of a hinge assembly utilized by the electronic device of FIG. 5.
Figure 7A:
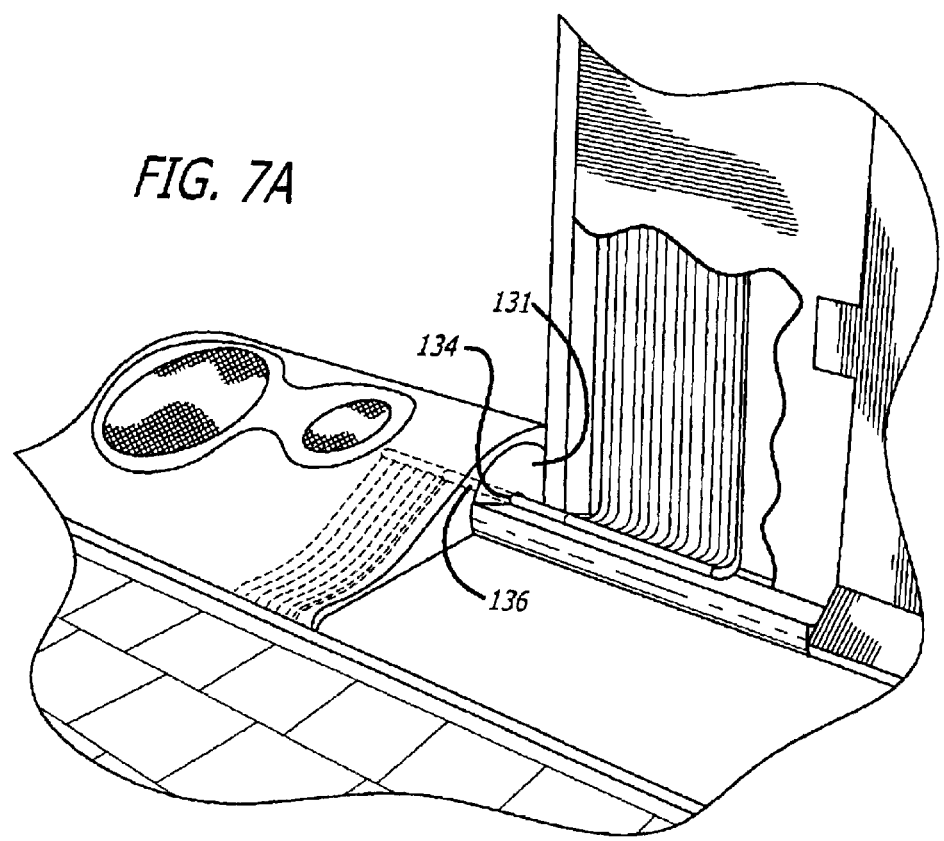
FIG. 7A is a perspective view of an interconnect routed through a feed path provided by an aperture of an end of the hinge assembly of FIG. 6.

Herein, as shown in FIGS. 6 and 7A, hinge assembly 130 is a brake hinge. As one embodiment of the invention, however, hinge assembly 130 comprises at least two ends 131 and 132 with a shaft 133 positioned between ends 131 and 132. Fixedly secured to body case 120 or a component therein, ends 131 and 132 may be adapted to slightly discourage the rotation of shaft 133, thereby operating as a brake hinge. Each end 131 and 132 includes an aperture 134 and 135 to enable an interconnect 136 to be routed there through.

In general, for one embodiment of the invention, shaft 133 features a third shaft portion 139 interposed between a first shaft portion 137 and a second shaft portion 138. Shaft portions 137 and 138 are configured with non-circular cross sectional areas (e.g., a semi-circular area with a flat perimeter and a curved perimeter). Third shaft portion 139 features a cross-sectional area that is less than the cross-sectional areas of first and second shaft portions 137 and 138.

Herein, first member 200 is pivotally coupled to shaft portions 137 and 138 while second member 220 is pivotally coupled to third shaft portion 139. Hinges may be used to achieve this pivotal coupling. It is contemplated, however, that shaft 133 may be configured according to any shape, but such configuration should enable rotation of shaft 133 without interfering with a feed path for interconnect 136 through apertures 134 and/or 135.

Figure 7B:
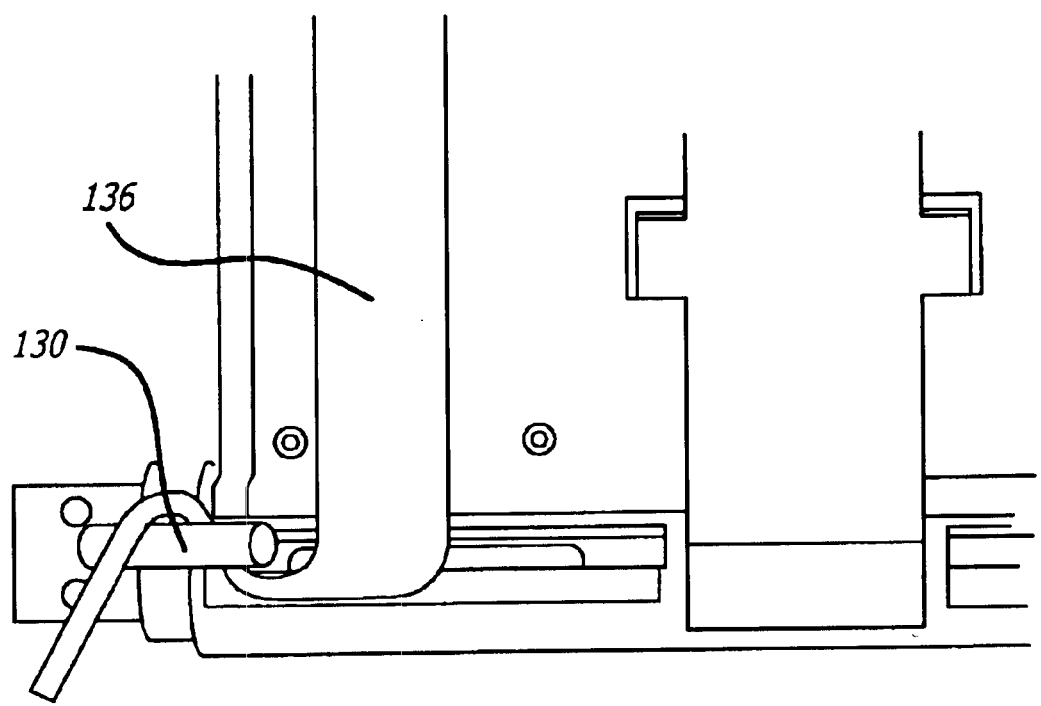
FIG. 7B is a perspective view of an interconnect wound around a portion of the hinge assembly of FIG. 6.

It is contemplated that interconnect 136 can be shared between body case 120 and display housing 110 through alterative embodiments. For instance, as shown in FIG. 7B, interconnect 136 is provided from body case 120 to display housing 110 by winding around a first portion of brake hinge 130. This embodiment may be used where apertures 134 and/or 135 of FIG. 7A are not provided.

Referring back to FIG. 5, second member 220 is pivotally coupled to hinge assembly 130 and second hinge unit 230, which is offset from first hinge unit 150 and comprises one or more hinges. For this embodiment, second hinge unit 230 is positioned in recessed area 117 of back display panel 114. Also, a first end 222 of second member 220 is angled by an angle B so as to prevent full intersection of the feed path through apertures 134 or 135. This prevents second member 220 from damaging an interconnect routed through aperture 134, when display housing 110 is vertically rotated. The angle "B" ranges between 15 degrees and 70 degrees for this embodiment.

For one embodiment of the invention, first member 200 includes a recessed area 205 sized to accommodate second member 220 so that members 200 and 220 may be substantially coplanar (i.e., generally lying in the same plane). For instance, recessed area 205 substantially contains second member 220 when electronic device 100 is placed in an OPENED or CLOSED position. At this time, a protrusion 225 of second member 220 is situated in recessed portion 206 of recessed area 205. In addition, recessed area 205 substantially contains second member 220 when electronic device 100 is placed in an INVERTED position. At this time, protrusion 225 of second member 220 is situated in recessed portion 207 of recessed area 205.

During rotation of display housing 110 in accordance with the horizontal axes of rotation established by first and second hinge units 150 and 230, second member 220 separates from and is no longer coplanar with first member 200. In addition, according to one embodiment of the invention, second member 220 also becomes skewed from (e.g. non-parallel with) first member 200.

In summary, first member 200 may be substantially coplanar and in parallel with second member 220 when display housing 110 (or second member 220) placed in a first position. In this "first" position, either a top portion or a bottom portion of display housing 110 is positioned to be generally flush against display support member 140 (see FIGS. 9A, 10A, 14A and 15A). However, when display housing 110 is placed in a second position, second member 220 becomes skewed from and is no longer coplanar with first member 200. In general, the second position is achieved when display housing 110 is detached from display support member 140 and rotated about horizontal axes established by hinge units 150 and 230.

In particular, as shown in FIGS. 11A, 12A, and 13A, initial clockwise rotation of display housing 110 along an axis of rotation established by first and second hinge units 150 and 230 would cause second member 220, initially coplanar with first member 200, to move away from first member 200. Also, second member 220 becomes skewed from, and thus is not in parallel with first member 200. Continued clockwise rotation of display housing 110 further separates second member 220 from first member 200 while second member 220 continues to remain non-parallel with each other. In one embodiment, the predetermined distance exceeds one-quarter of an inch; however, any predetermined distance can be accommodated.

As shown in FIGS. 13A and 14A, further clockwise rotation of display housing 110 along a collective axis of rotation established by first and second hinge units 150 and 230, generally exceeding 90 degrees from its non-rotated state at FIG. 9A, causes reduced separation of first member 200 and second member 220. When display housing 110 is inverted as shown in FIG. 15A, second member 220 would be again positioned in recessed area 205 of first member 200 of FIG. 5. As a result, second member 220 is again coplanar and in parallel with the first member 200.

Figure 8:
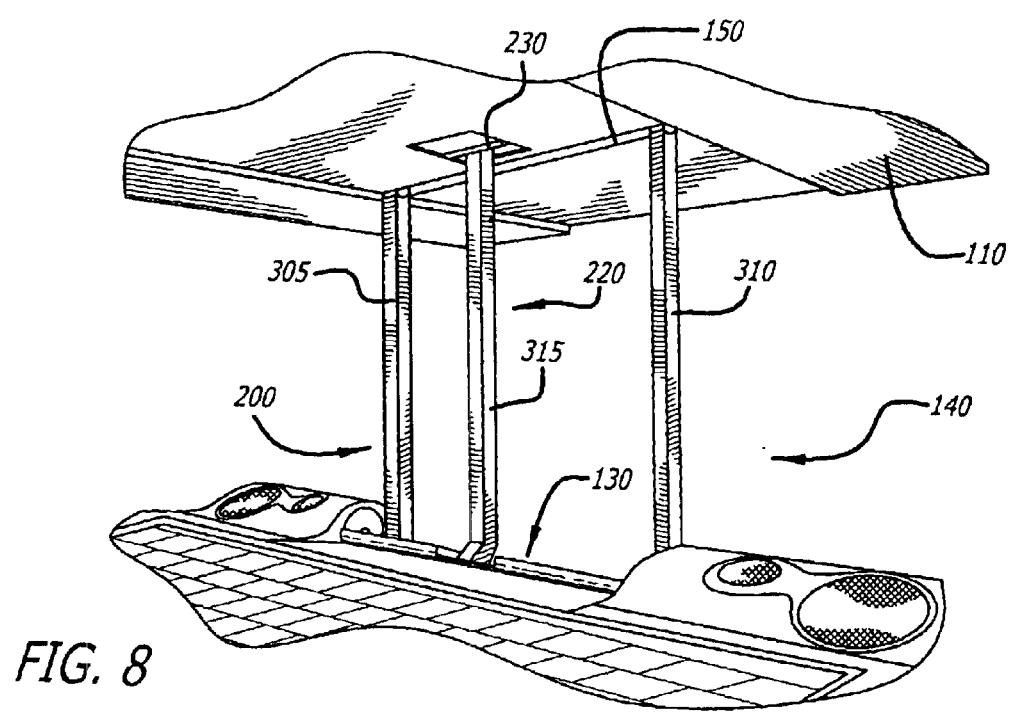
FIG. 8 is a perspective view of a second exemplary embodiment of display support mechanism 140 of FIG. 1.

Referring now to FIG. 8, a perspective view of a second embodiment of display support mechanism 140 is shown. Herein, display housing 110 remains pivotally coupled to display support mechanism 140 through first hinge unit 150. However, display support mechanism 140 is configured with a plurality of arms. Herein, first member 200 comprises a first arm 305 that is pivotally coupled to one end of first hinge unit 150 and a second arm 310 that is pivotally coupled to the other end of first hinge unit 150. First and second arms 305 and 310 may be pivotally coupled to first shaft portion 137 and second shaft portion 138, respectively. Second member 220 comprises a third arm 315 that is pivotally coupled to hinge assembly 130 and second hinge unit 230. Arms 305, 310 and 315 would be sized with a thickness that is less than the depth of recess area 115 of FIG. 2.

Referring now to FIGS. 9A–9C, a cross-sectional view of electronic device 100 of FIG. 1 is shown along with detailed views of pivotally coupled ends of first and second members 200 and 220. For this embodiment of the invention, display support mechanism 140 is configured with first member 200 and second member 220 which may be substantially coplanar with each other. Display housing 110 is positioned to be flush against display support mechanism 140.

More specifically, a first end 202 of first member 200 is pivotally coupled and generally proximate to an outer edge of shaft 133 (e.g., shaft portion 138) while an angled first end 222 of second member 220 is pivotally coupled to an inner portion of shaft 133 (e.g., third shaft portion 139). A second end 204 of first member 200 is coupled to first hinge unit 150 while a second end 224 of second member 220 is coupled to second hinge unit 230. Thus, while electronic device 100 is in the CLOSED position, both first and second members 200 and 220 are substantially coplanar to each other as shown.

Also, as shown in FIGS. 9B and 9C, when electronic device 100 is placed in the CLOSED position, it is appreciated that plane A is oriented to be skewed from and not in parallel with plane B. Plane A contains the pivotal points at ends 202 and 222 of first and second members 200 and 220. Plane B contains pivotal points at ends 204 and 224 of first and second members 200 and 220, respectively.

Referring to FIGS. 10A–10C, a cross-sectional view of electronic device 100 is shown along with detailed views of pivotally coupled ends of first and second members 200 and 220. For this embodiment of the invention, display housing 110 and display support mechanism 140 have been vertically pivoted simultaneously as depicted by arrow 250. However, there has not yet been any angular rotation about horizontal axes of rotation established by first and second hinge units 150 and 230 so that display housing 110 remains flush against display support mechanism 140. As a result, first and second members 200 and 220 remain generally coplanar as shown in FIG. 10C.

Herein, as shown in FIG. 10B and in comparison with FIG. 9B, shaft 133 of hinge assembly 130 has been rotated in a clockwise direction, less than 90 degrees as depicted by arrow 255 of FIG. 9B. Such rotation has caused corresponding movement of first end 202 of first member 200 and first end 222 of second member 220, which still maintains a feed path for an interconnect through aperture 135.

Referring now to FIGS. 11A–11C, a cross-sectional view of electronic device 100 is shown along with detailed views of pivotally coupled ends of first and second members 200 and 220. For this embodiment of the invention, display housing 110 has been vertically rotated in a counter-clockwise direction about axes established by first hinge unit 150 and second hinge unit 230 as depicted by arrow 260. However, there is no rotation of shaft 133 at hinge assembly 130. This causes first member 200 and second member 220 to partially separate proximate to hinge units 150 and 230.

Referring to FIGS. 12A–12C, a cross-sectional view of electronic device 100 is shown along with detailed views of pivotally coupled ends of first and second members 200 and 220. For this embodiment of the invention, display housing 110 continues to be vertically rotated in a counter-clockwise direction exemplified by arrow 265. Such rotation encourages shaft 133 of hinge assembly 130 to be rotated in a counter-clockwise direction as compared with a position set forth in FIGS. 11A–11C.

Due to the angled first end 222 of second member 220, the rotation of shaft 133 causes first member 200 to be shifted downward and second member 220 to be shifted upward. Such shifting further causes separation between first member 200 and second member 220. At this position, first member 200 and second member 220 of electronic device 100 are slightly skewed from each other and an open feed path through aperture 135 is still maintained.

As shown in FIGS. 12B and 12C, once display housing 110 is detached and rotated from display support mechanism 140 as shown herein, plane C is in parallel with plane D. Plane C contains pivotal points at ends 202 and 222 of first and second members 200 and 220, while plane D contains pivotal points at ends 204 and 224 of first and second members 200 and 220, respectively.

Referring to FIGS. 13A–13C, a cross-sectional view of electronic device 100 is shown along with detailed views of pivotally coupled ends of first and second members 200 and 220. For this embodiment of the invention, display housing 110 continues to be vertically rotated in a counter-clockwise direction as indicated by arrow 270. At this position, display housing 110 has almost been fully inverted. Such rotation encourages further rotation of shaft 133 in a counter-clockwise direction as compared with its position illustrated in FIGS. 12A–12C.

The rotation of shaft 133 continues to shift first member 200 downward and second member 220 upward. This shifting repositions first member 200 and second member 220 with a separation distance less than that illustrated in FIG. 12A.

Referring now to FIGS. 14A–14C, a cross-sectional view of electronic device 100 is shown along with detailed views of pivotally coupled ends of first and second members 200 and 220. For this embodiment of the invention, display housing 110 has almost been inverted. Thus, the back display panel of display housing 110 is flush against display support mechanism 140.

In this position, shaft 133 of hinge assembly 130 has been further rotated in a counter-clockwise direction as compared with a position set forth in FIGS. 13A–13C. The rotation of shaft 133 repositions first member 200 and second member 220 to be generally coplanar to each other as similarly shown in FIGS. 9A and 10A. As shown, an open feed path is still maintained, albeit the spacing allowed for the interconnect is reduced from that shown previously.

Referring now to FIGS. 15A–15C, a cross-sectional view of electronic device 100 of FIG. 4 is shown along with detailed views of pivotally coupled ends of first and second members 200 and 220. For this embodiment of the invention, display housing 110 has been inverted where display support mechanism 140 is positioned between display housing 110 and body case 120. Back panel 114 of display housing 110 is generally flush against front panel section 122 of body case 120.

Also, as shown in FIGS. 15B and 15C, when display housing 110 is placed in the INVERTED position, plane E is oriented to be skewed and not in parallel with plane F. Plane E contains pivotal points at ends 202 and 222 of first and second members 200 and 220. Plane F contains pivotal points at ends 204 and 224 of first and second members 200 and 220, respectively.

In summary, when display housing 110 is detached from display support mechanism 140 and is rotated about one or more horizontal axes of rotation established by hinge units 150 and 230, a first plane inclusive of pivotal points at the same end of first and second members 200 is in parallel with a second plane inclusive of pivotal points at the other end of first and second members 220. The amount of rotation may vary between 10 and 170 degrees from the first position, namely a position of the display housing 110 immediately prior to commencing angular rotation of the display housing 110 about the horizontal axes of rotation. At the first position, a portion of the back display panel of the display housing 110 is generally flush against the display support mechanism 140.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible.

What is claimed is:

1. An apparatus for rotating a display housing for a flat panel display, comprising:
    a hinge assembly; and
    a display support mechanism comprising
        a first member pivotally coupled to the hinge assembly and adapted for coupling to the display housing, and
        a second member pivotally coupled to the hinge assembly and adapted for coupling to the display housing, the second member being substantially coplanar to the first member when placed in a first position and being non-parallel with the first member when placed in a second position.

2. The apparatus according to claim 1, wherein the second member of the display support mechanism comprising a first angled end pivotally coupled to the hinge assembly and a second end pivotally coupled to a back display panel of the display housing.

3. The apparatus according to claim 2, wherein the second member of the display support mechanism being in the second position after rotation of the display housing about an axis of rotation provided by the second end of the second member, an amount of rotation of the display housing ranging between 10 degrees and 170 degrees from an orientation of the display housing when the second member is in the first position.

4. The apparatus according to claim 1, wherein the hinge assembly includes a first end having a conduit substantially at a center axis of the first end and adapted for routing of an interconnect therethough, a second end, and a shaft rotationally coupled to the first end and the second end.

5. The apparatus according to claim 4, wherein the shaft comprising (i) a first shaft portion having a non-circular cross-sectional area, (ii) a second shaft portion having a non-circular cross-sectional area, and (iii) a third shaft portion interposed between the first shaft portion and the second shaft portion, the third shaft portion having a cross-sectional area less than the non-circular cross-sectional areas of the first shaft portion and the second shaft portion.

6. The apparatus according to claim 5, wherein the first member of the display support mechanism being pivotally coupled to the first shaft portion and the second shaft portion.

7. The apparatus according to claim 6, wherein the second member of the display support mechanism comprising a first end being angled from a remainder of the second member by an angle greater than fifteen degrees and less than 360 degrees and being pivotally coupled to the third shaft portion.

8. The apparatus according to claim 4, wherein the interconnect to provide signaling to circuitry for controlling the flat panel display.

9. The apparatus according to claim 1, wherein the first member of the display support mechanism being pivotally coupled to a first hinge unit positioned within a recessed area of the display housing and the second member of the display support mechanism being pivotally coupled to a second hinge unit positioned within the recessed area.

10. The apparatus according to claim 1, wherein the first member of the display support mechanism comprising (i) a first end pivotally coupled to the hinge assembly and (ii) a second end pivotally coupled to the display housing, and the second member of the display support mechanism comprising (i) a first angled end pivotally coupled to the hinge assembly and (ii) a second end pivotally coupled to the display housing.

11. The apparatus according to claim 10, wherein a first plane containing pivotal points associated with the first ends of the first and second members of the display support mechanism is in parallel with a second plane containing pivotal points associated with the second ends of the first and second members when the display housing is rotated about axes of rotation established by the second ends of the first and second members.

12. The apparatus according to claim 1, wherein the first member includes a plurality of arms.

13. A display support mechanism adapted for rotating a display housing having a flat panel display about a horizontal axis of rotation, comprising:
    a first member pivotally coupled to a back display panel of the display housing at a first pivotal point; and
    a second member pivotally coupled to the back display panel of the display housing at a second pivotal point so that the first and second pivotal points collectively form the horizontal axis of rotation, the second member being substantially coplanar to the first member when the display housing is placed in a first position and being skewed from and non-parallel with the first member when the display housing is rotated about the horizontal axis and placed in a second position.

14. The display support mechanism according to claim 13, wherein both the first member and the second member are pivotally coupled to a hinge assembly.

15. The display support mechanism according to claim 14, the second member comprising a first angled end pivotally coupled to the hinge assembly and a second end pivotally coupled to the back display panel of the display housing.

16. The display support mechanism according to claim 15, wherein the first member comprising a first end pivotally coupled to the hinge assembly and a second end pivotally coupled to the back display panel of the display.

17. The display support mechanism according to claim 14, wherein
    the first member of the display support mechanism comprising a first end pivotally coupled to the hinge assembly at a third pivotal point and a second end pivotally coupled to the display housing at the first pivotal point, and
    the second member of the display support mechanism comprising a first end pivotally coupled to the hinge assembly at a fourth pivotal point and a second end pivotally coupled to the display housing at the second pivotal point.

18. The display support mechanism according to claim 17, wherein a first plane containing the third and fourth pivotal points is in parallel with a second plane containing the first and second pivotal points when the display housing is placed in the second position.

19. The display support mechanism according to claim 18, wherein the display housing is in the second position, differing from the first position, when the display housing is rotated about the horizontal axis and is re-positioned without being flush against the display support mechanism.

20. The display support mechanism according to claim 13, wherein the first member being pivotally coupled to a first hinge unit positioned within a recessed area of the display housing and the second member being pivotally coupled to a second hinge unit positioned within the recessed area.

21. The display support mechanism according to claim 13 being situated with a top surface of the first member substantially coplanar with a top surface of the back display panel of the display housing when the display housing placed in the first position.

22. The display support mechanism according to claim 13, wherein a portion of the display housing is positioned to be flush against the display support mechanism when the display housing is placed in the first position.

23. The display support mechanism according to claim 22, wherein a bottom portion of the display housing is flush against the display support mechanism when the display housing is placed in the first position.

24. The display support mechanism according to claim 22, wherein the display housing is in the second position after rotation of the display housing about the horizontal axis by less than 180 degrees of rotation from the first position.

25. The display support mechanism according to claim 13, wherein the display housing is in the second position, differing from the first position, when the display housing is rotated about the horizontal axis of rotation and the display housing is only in contact with the display support mechanism at the first pivotal point and the second pivotal point.

26. An electronic device, comprising:
   a body case;
   a hinge assembly coupled to the body case; and
   a display housing comprising a flat panel display bordered by a front display panel and a rear portion of the flat panel display covered by a back display panel; and
   a display support mechanism comprising
      a first member pivotally coupled to the hinge assembly at a first pivotal point and pivotally coupled to the display housing at a second pivotal point, and
      a second member pivotally coupled to the hinge assembly at a third pivotal point and pivotally coupled to the display housing at a fourth pivotal point;
   wherein a first plane containing the first and third pivotal points is in parallel with a second plane containing the second and fourth pivotal points when the display housing is placed in a first position, and the first plane is oriented to be non-parallel with the second plane when the display housing is placed in a second position.

27. The electronic device according to claim 26, the second member comprising (i) a first end angled from a reminder of the second member and pivotally coupled to a rotational shaft of the hinge assembly at the third pivotal point and (ii) a second end pivotally coupled to the back display panel of the display housing at the fourth pivotal point.

28. The electronic device according to claim 26, wherein the hinge assembly comprising a first end having a conduit for routing an interconnect from a component internally contained within the body case to circuitry to control the flat panel display within the display housing.

29. The electronic device according to claim 26, wherein the display housing is in the second position, differing from the first position, after the display housing has been rotated about a horizontal axis established by the second and fourth pivotal points and positioned without being flush against the display support mechanism.

30. The electronic device according to claim 26, wherein the display housing is in the second position, differing from the first position, when the display housing is rotated about a horizontal axis established by the second and fourth pivotal points and the display housing is only in contact with the display support mechanism at the second pivotal point and the fourth pivotal point.

\* \* \* \* \*